(12) United States Patent
Chen et al.

(10) Patent No.: US 12,437,137 B2
(45) Date of Patent: Oct. 7, 2025

(54) METHOD AND APPARATUS OF DESIGNING INTEGRATED CIRCUIT

(71) Applicant: CHANGXIN MEMORY TECHNOLOGIES, INC., Hefei (CN)

(72) Inventors: Chuanjiang Chen, Hefei (CN); Li Tang, Hefei (CN); Li Bai, Hefei (CN); Kang Zhao, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 705 days.

(21) Appl. No.: 17/805,931

(22) Filed: Jun. 8, 2022

(65) Prior Publication Data

US 2023/0010661 A1 Jan. 12, 2023

Related U.S. Application Data

(63) Continuation of application No. PCT/CN2021/121362, filed on Sep. 28, 2021.

(30) Foreign Application Priority Data

Jul. 8, 2021 (CN) .......................... 202110772640.4

(51) Int. Cl.
*G06F 30/392* (2020.01)
*G06F 30/398* (2020.01)
*G06F 119/06* (2020.01)

(52) U.S. Cl.
CPC .......... *G06F 30/392* (2020.01); *G06F 30/398* (2020.01); *G06F 2119/06* (2020.01)

(58) Field of Classification Search
CPC ... G06F 30/392; G06F 30/398; G06F 2119/06
USPC .......................................................... 716/112
See application file for complete search history.

(56) References Cited

U.S. PATENT DOCUMENTS

| | | | | |
|---|---|---|---|---|
| 6,892,363 | B2* | 5/2005 | Li | G06F 30/39 |
| | | | | 716/112 |
| 7,152,215 | B2* | 12/2006 | Smith | H01L 21/3212 |
| | | | | 257/E21.244 |
| 7,661,078 | B1* | 2/2010 | Noice | G06F 30/39 |
| | | | | 716/136 |

(Continued)

FOREIGN PATENT DOCUMENTS

| CN | 101290904 A | 10/2008 |
|---|---|---|
| CN | 104932732 A | 9/2015 |

(Continued)

OTHER PUBLICATIONS

International Search Report cited in PCT/CN2021/121362 mailed Apr. 6, 2022, 8 pages.

*Primary Examiner* — Jack Chiang
*Assistant Examiner* — Suchin Parihar
(74) *Attorney, Agent, or Firm* — Kilpatrick Townsend & Stockton LLP (57) ABSTRACT

A method and an apparatus of designing an integrated circuit are provided. The method includes: S1, loading a power fill to a circuit layout with original metal lines; S2, checking whether a current layout includes a region with a spacing error; if yes, performing S3; otherwise, outputting the current layout; and S3, pruning a power fill shape corresponding to the region with a spacing error by a predetermined spacing width delta, and returning to the S2.

16 Claims, 8 Drawing Sheets

(56) References Cited

U.S. PATENT DOCUMENTS

| | | | |
|---|---|---|---|
| 8,161,425 B1* | 4/2012 | Noice | H01L 23/522 |
| | | | 716/54 |
| 11,126,781 B2 | 9/2021 | Kim et al. | |
| 2004/0019868 A1* | 1/2004 | Li | G06F 30/39 |
| | | | 716/112 |
| 2006/0234166 A1 | 10/2006 | Lee et al. | |
| 2008/0121939 A1* | 5/2008 | Murray | H01L 22/20 |
| | | | 716/52 |

FOREIGN PATENT DOCUMENTS

| | | |
|---|---|---|
| CN | 110390122 A | 10/2019 |
| CN | 110991139 A | 4/2020 |

\* cited by examiner

FIG. 11

METHOD AND APPARATUS OF DESIGNING INTEGRATED CIRCUIT

CROSS-REFERENCE TO RELATED APPLICATIONS

This is a continuation of International Application No. PCT/CN2021/121362, filed on Sep. 28, 2021, which claims the priority to Chinese Patent Application 202110772640.4, filed on Jul. 8, 2021. The entire contents of International Application No. PCT/CN2021/121362 and Chinese Patent Application 202110772640.4 are incorporated herein by reference.

BACKGROUND

With the continuous evolution of the semiconductor process, the width of the metal line in the chip is getting narrower, resulting in a larger resistance value on the metal line. At the same time, the supply voltage of the chip is decreasing, which makes an IR drop effect of the chip more obvious. The is severe IR drop slows down a switching speed of metal-oxide-semiconductor (MOS) transistors, and greatly affects the performance and even function of the whole chip.

To mitigate the IR drop effect of the power and ground nets on the chip, the project designer will increase the density of a power mesh on the layout to help reduce the equivalent resistance from a power pin pad to a logic gate cell. As the resistance on the power mesh is reduced, the IR drop on the power mesh is also reduced. The method of increasing the density of the power mesh on the layout is referred to as adding power fill to the layout.

In the power fill approach, large power meshes are added to each layer of metal lines in a back end of line (BEOL) on the layout to help reduce the resistance on the power nets. However, since original metal lines on the layout are already very dense, the power fill meshes added later can easily generate a lot of space-related layout design rule check (DRC) physical verification errors with the existing metal lines in the circuit.

How to fix the layout DRC physical verification errors and obtain sufficient power fill is an urgent technical problem to be solved in this field.

SUMMARY

The present application relates to the field of semiconductor memories, and in particular, to a method and an apparatus of designing an integrated circuit.

According to a first aspect of the present application, a method of designing an integrated circuit is provided, including:

S1: loading a power fill to a layout with original metal lines;

S2: checking whether a current layout comprises a region with a spacing error; if yes, performing S3; otherwise, outputting the current layout; and S3: pruning a power fill shape corresponding to the region with a spacing error by a predetermined spacing width, and returning to the S2.

According to another aspect of the present application, an apparatus of designing an integrated circuit is provided, which includes:

one or more processors; and a storage apparatus, configured to store one or more programs, wherein the one or more programs, when executed by the one or more processors, cause the one or more processors to execute operations of:

loading a power fill to a layout;

checking whether a current layout includes a region with a spacing error, if yes, repairing the region with a spacing error; otherwise, outputting a repaired layout; and pruning a power fill shape corresponding to the region with a spacing error by a predetermined spacing width, and outputting the current layout after the pruning to the spacing error checking module.

DETAILED DESCRIPTION

To make the objectives, technical solutions, and advantages of the present application clearer, the present application will be further described in detail below with reference to specific implementations and the accompanying drawings. It should be understood that these descriptions are merely exemplary and are not intended to limit the scope of the present application. In addition, in the following description, descriptions of conventional structures and technologies are omitted to avoid unnecessarily confusing the concepts of the present application.

Figure 1:
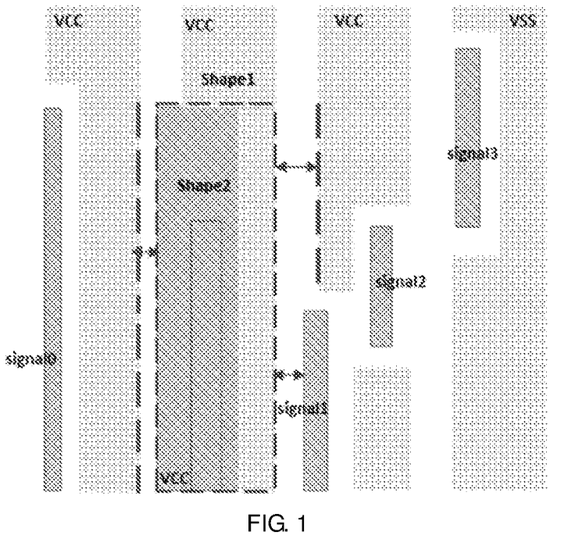
FIG. 1 is a schematic diagram of a power fill in the prior art.

With reference to FIG. 1, when added a power fill (shape1) and an existing metal line 1 (shape2) on the layout are located on a same net (the dashed box part), the added power fill "shape" will be merged with the existing metal line on the layout, as "shape1" and "shape2" shown in FIG. 1. When they are on different nets, the power fill of Metal1 will keep a distance from Metal1, where the signal represents a metal line signal. However, the merge on the same net causes a new DRC space physical verification error. The merge (the dashed box part) of shape1 and shape2 results in a new segment of Metal1 whose width exceeds the width of original shape2 on the layout. As the width of Metal1 increases, this segment of Metal1 needs to have larger distances from other Metal1 on the layout. The increased width of Metal1 reduces a distance from neighboring power fill and a distance from neighboring Metal1, where the is distances are marked by the two-way arrows in FIG. 1. This will cause Metal1 spacing errors as indicated by the two-way arrows. Therefore, it is necessary to increase the distances marked by the two-way arrows.

The whole chip has about hundreds of thousands of such DRC space physical verification errors caused by the addition of power fill as shown in FIG. 1. Due to the tremendous number, it is extremely time-consuming to manually fix the errors by layout engineers. Moreover, in layout regions with DRC space physical verification errors, the DRC can only report insufficient spacing between metal lines. During repair, correct spacing between metal lines in each region with an error is unknown. Therefore, the simplest method to fix such DRC spacing errors caused by the power fill merge is to prune the added power fill directly using a threshold of the DRC space check. However, in such a rough method, a large area of power fill will be pruned off when both sides of a region with a DRC spacing error have newly added power fill, which does not meet the requirements of the designer.

Figure 2A:
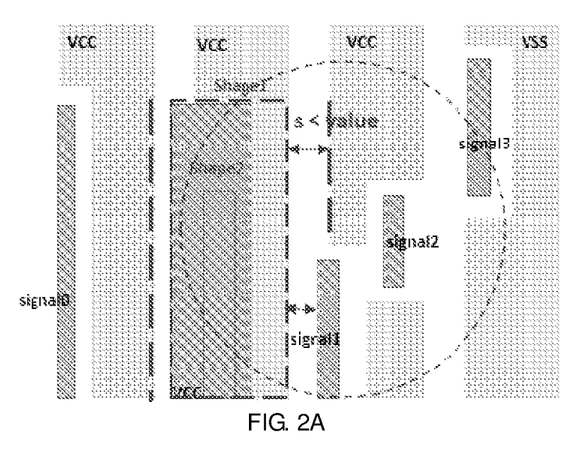
FIG. 2A is schematic diagram of a pruning region in the prior art.
Figure 2B:
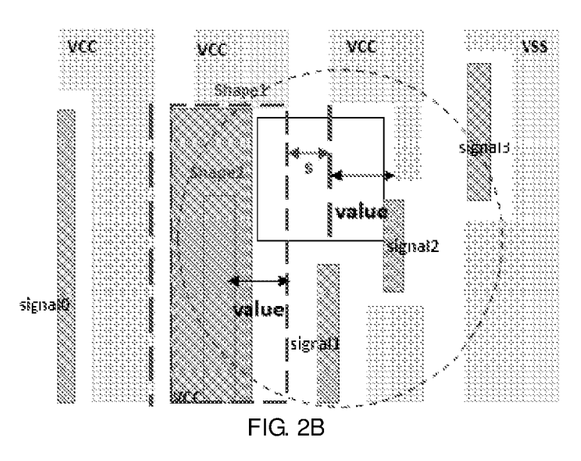
FIG. 2B is a schematic diagram of the pruning region in FIG. 2A after being pruned.

As shown in FIG. 2A, the spacing s marked by the two-way arrow is less than a minimum spacing "value" of Metal1. The specific value of s is unknown, except that s<value. To fix this DRC space error, the simplest method is to prune the power fill at both sides of the DRC spacing error directly using "value". The pruning result is as shown in FIG. 2B. After such rough pruning, there will be a relatively large blank region (in the dashed box) on Metal1, which does not meet the design requirements. The length of the region pruned off in this method is s+2 value, which is excessively long.

Figure 3:
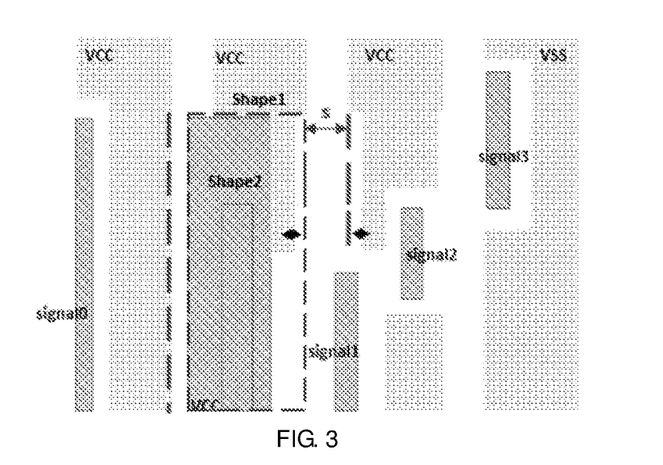
FIG. 3 is a schematic principle diagram of iterative pruning.

An ideal pruning value of the Metal1 power fill should be (value−s)/2 for each side, as shown in FIG. 3. A value close to this ideal pruning value can ensure spacing achieved by pruning the power fill to be approximately equal to the minimum spacing "value" required by Metal1. In this way, the DRC spacing errors can be corrected, while sufficient power fill is retained on the layout.

Considering the above, it is necessary to provide a tool that can check the layout in real time, prune the power fill mesh with micro steps in real time according to the real-time DRC space check result rather than removing a large area of power fill at a time, and automatically control the number of pruning iterations.

In order to add as much power fill as possible to the layout while correcting the consequent DRC physical verification errors related to layout spacing, the present application provides a method and an apparatus of designing an integrated circuit, which can automatically fix spacing errors after the addition of a power fill, and in particular, can automatically fix spacing errors stepwise in real time. Main steps of automatically fixing spacing errors after the addition of a power fill include: performing a DRC space check on a layout in real time; pruning a power fill mesh according to a check result to fix a DRC spacing error, and determining whether to perform a next iteration, until all spacing errors are fixed after iterative pruning.

Figure 4:
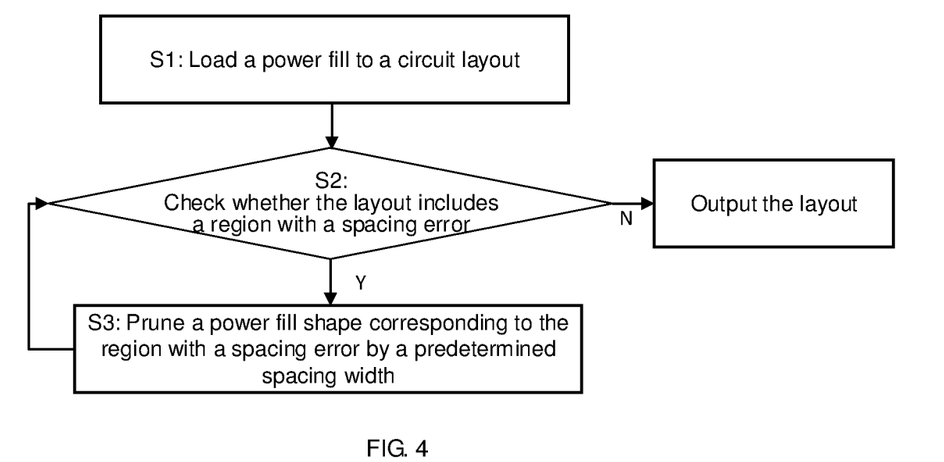
FIG. 4 is an exemplary flowchart of an integrated circuit layout process.

FIG. 4 is a schematic flowchart of an integrated circuit design method according to the present application.

In an implementation, the method that can fix layout spacing errors in the present application includes the following steps:

S1: Load a power fill to a circuit layout.

S2: Check whether a current layout includes a region with a spacing error; if yes, perform S3; otherwise, output the layout without any spacing error.

S3: Prune a power fill shape corresponding to the region with a spacing error by a predetermined spacing width delta, and return to S2.

After a power fill mesh is added in step S1, a wider metal line is obtained through merging. A DRC spacing check is performed in real time to calculate each region with a spacing error, that is, each region in which metal line spacing<value, where value is a given minimum value allowed of the metal line spacing, i.e., a minimum spacing threshold. The minimum spacing threshold is related to a width of the metal line.

In some optional embodiments of the present application, in step S2, a region with a spacing error is searched for through the DRC spacing check. Metal line spacing in a region with a spacing error is less than the minimum spacing threshold. Two metal edges tangent to the region with a spacing error can be found, where spacing between the two metal edges along a width direction is less than the minimum spacing threshold.

Figure 6A:
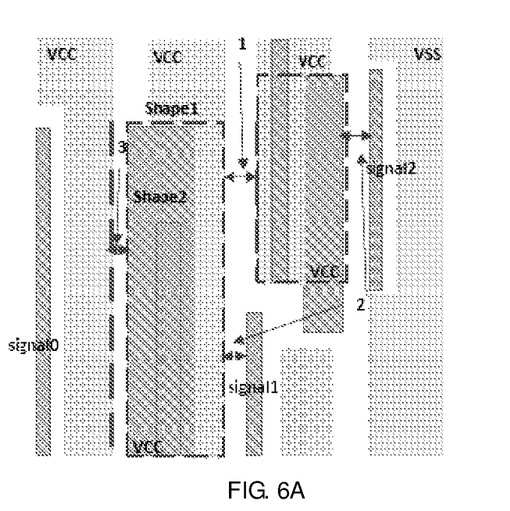
FIG. 6A is a schematic diagram of checking regions with a spacing error in real time according to an embodiment.
Figure 6B:
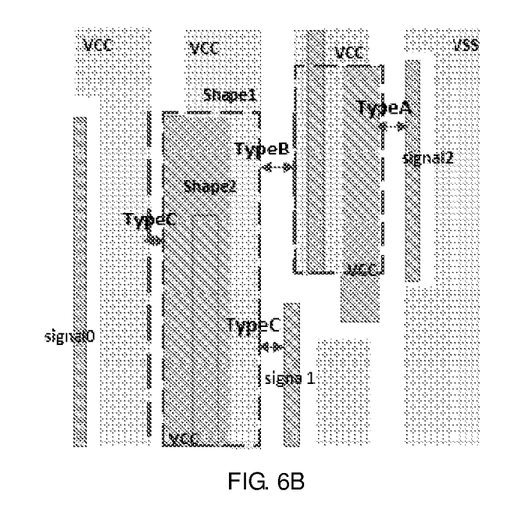
FIG. 6B is a schematic diagram of classification of regions with a spacing error according to an embodiment.
Figure 7:
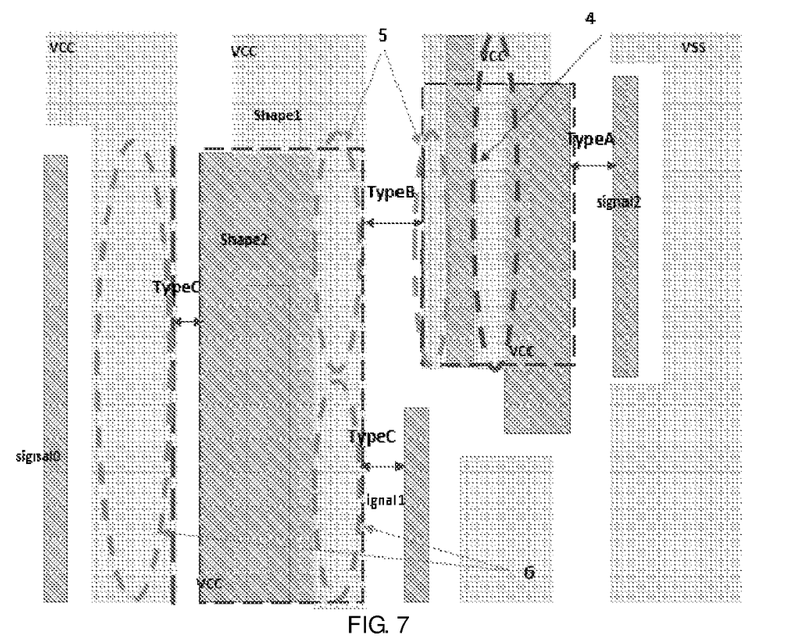
FIG. 7 is a schematic diagram of prunable regions according to an embodiment.

In some optional embodiments of the present application, regions with spacing errors include three error types, as shown in FIG. 6 to FIG. 7:

First error type TypeA: two metal edges of the region with an error are both formed by original metal lines.

Second error type TypeB: two metal edges of the region with an error are both formed by power fill shapes.

Third error type TypeC: one metal edge of the region with an error is formed by a power fill shape, and the other metal edge is formed by an original metal line.

In some optional embodiments of the present application, in step S3, after all metal lines with spacing errors are positioned on the layout, for each metal line, a repair module will find an edge on the metal line which is tangent to the spacing error, and the edge of the metal line is automatically pruned by a small predetermined spacing width towards the interior of the metal line. After each pruning operation, a detection module checks again whether the whole layout has any spacing error; if yes, the edge is further pruned by a predetermined spacing width on the basis of the previous pruning operation. By iterative pruning with a step size of the predetermined spacing width, all the spacing errors are fixed eventually. By setting a small pruning value delta, the power fill mesh is modified step by step through iterative pruning, until there is no spacing error in the final layout.

In some optional embodiments of the present application, the width direction is a first direction or an opposite direction of the first direction. Spacing between the two metal edges tangent to the region with the spacing error along the width direction is less than the minimum spacing threshold. A pruning direction is the first direction or the opposite direction of the first direction, and is a pruning result causes the spacing between the two metal edges to increase the predetermined spacing width delta.

In some optional embodiments of the present application, the pruning a power fill shape corresponding to the region with a spacing error by a predetermined spacing width delta includes:

If the error type is the first error type TypeA, two metal edges are both formed by original metal lines; since the original metal lines are not allowed to be pruned, in the method of the present application, power fill shapes merged or overlapping with the original metal lines of the region with an error are used as prunable regions. In this case, the power fill shapes connected to the two original metal lines are pruned by a half of the predetermined spacing width delta respectively along a direction for expanding the spacing. The connection includes electrical contact, and after the power fill is added, power fill shapes are in electrical contact with the original metal lines.

If the error type is the second error type TypeB, two metal edges of the region with an error are both formed by power fill shapes. Therefore, the two power fill shapes at both sides of the region with an error are prunable regions. In this case, the power fill shapes are pruned by a half of the predetermined spacing width, i.e., delta/2 respectively.

If the error type is the third error type TypeC, one of two metal edges of the region with an error is formed a power fill shape, and the other is formed by an original metal line. Therefore, the power fill shape at one side of the region with an error is a prunable region. In this case, the power fill shape is pruned by the predetermined spacing width delta along the direction for expanding the spacing. On the other hand, a power fill shape connected to the original metal line may be pruned by a half of the predetermined spacing width delta, and the power fill shape forming one of the metal edges is pruned by a half of the predetermined spacing width delta along the direction for expanding the spacing.

Figure 5A:
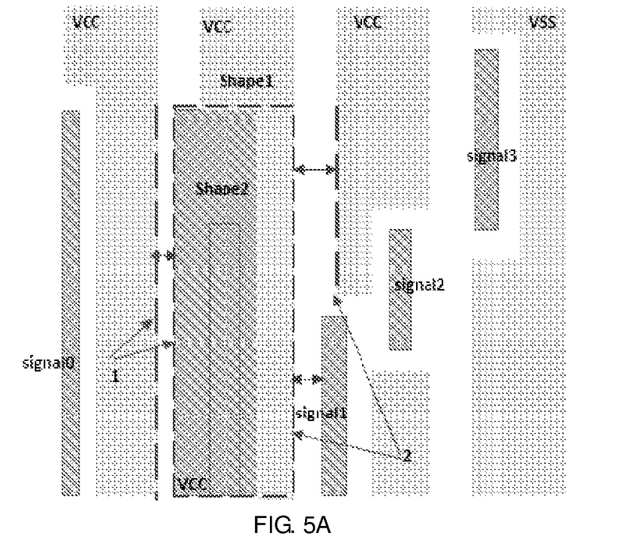
FIG. 5A is a schematic diagram of checking regions with an error in real time with a tool.
Figure 5B:
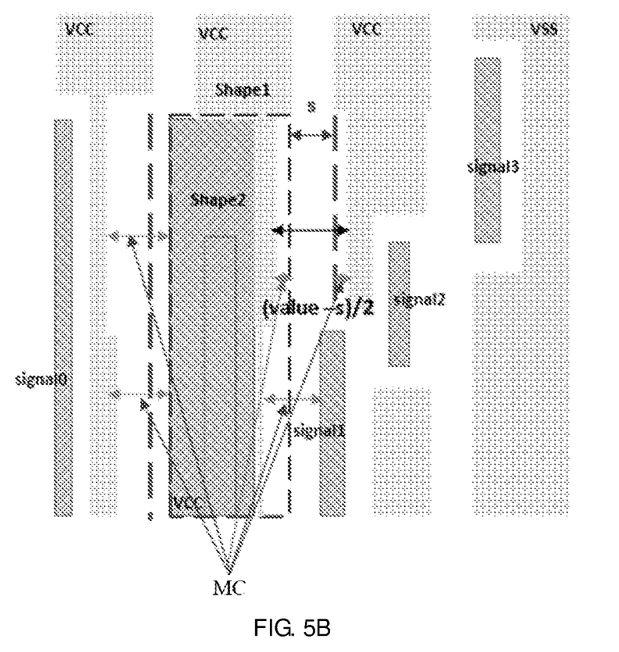
FIG. 5B is an exemplary diagram of an output result of multiple iterations after real-time checking with the tool.

In some optional embodiments of the present application, regions marked is by 1 and 2 in FIG. 5A are regions between which spacing needs to be expanded due to merging, and the dashed box shows a metal-thickened region. The DRC space check is performed in real time, and DRC spacing errors of metal lines obtained by an engine through real-time analysis are iterated automatically. FIG. 5B shows a final layout without any spacing error that is obtained after multiple automatic correction iterations, where the mark MC in the figure indicates clearance of the DRC space errors.

This integrated circuit layout method can help layout engineers efficiently solve the metal DRC spacing errors caused by the addition of a power fill on the layout, which greatly saves time for the layout engineers. The automatic stepwise method of fixing DRC spacing errors generated after addition of power fill to a chip layout can correct the DRC spacing errors while retaining as many added power fill meshes as possible.

Figure 8:
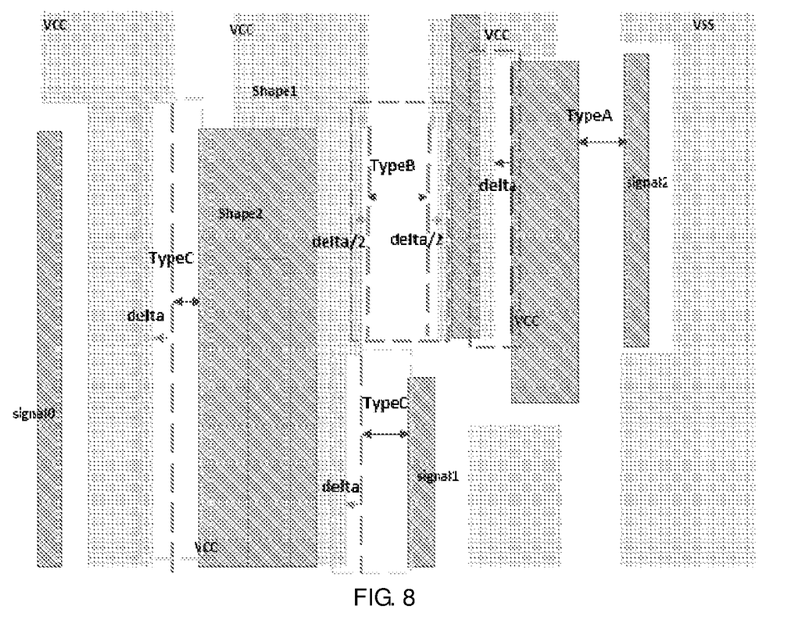
FIG. 8 is a schematic diagram of stepwise pruning according to an is embodiment.
Figure 9:
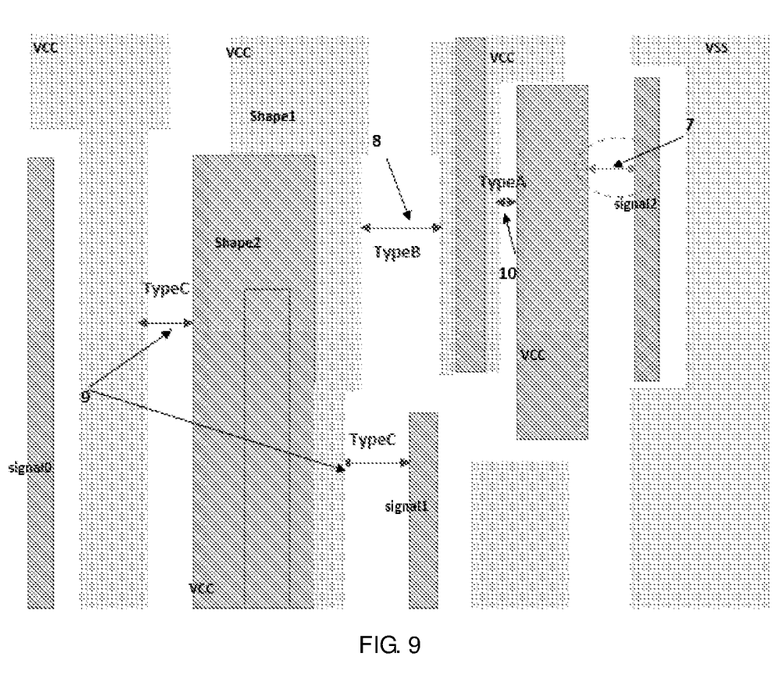
FIG. 9 is a schematic diagram after stepwise pruning according to an embodiment.

The tool for automatically fixing DRC spacing errors after addition of a power fill is further described in detail below with reference to an embodiment. FIG. 6A is a schematic diagram of checking spacing errors in real time according to an embodiment; FIG. 6B is a schematic diagram of classification of regions with a spacing error according to an embodiment; FIG. 7 is a schematic diagram of prunable regions according to an embodiment; FIG. 8 is a schematic diagram of stepwise pruning according to an embodiment; and FIG. 9 is a schematic diagram after stepwise pruning according to an embodiment.

The process of the integrated circuit layout is as follows:
S1: Load a power fill to a layout.
S2: Check whether a current layout includes a region with a spacing error; if yes, perform S3; otherwise, output a repaired layout.
S3: Prune a power fill shape corresponding to the region with a spacing error by a predetermined spacing width, and return to S2.

It is detected in S2 that after the addition of the power fill, metal lines located on the same net are merged, which results in a wider metal line. Consequently, DRC spacing errors appear in regions marked by two-way is arrows, and spacing between these regions needs to be increased. As shown in FIG. 6A, the two-way arrows indicate regions with DRC spacing errors, where 1, 2, and 3 in the figure represent metal-widened regions of which the spacing needs to be increased, that is, regions where metal line spacing is less than value. With reference to FIG. 6B, regions with DRC spacing errors on the layout are classified into three types:

TypeA: two metal edges of the spacing error are designed original metal lines.

TypeB: two metal edges of the spacing error are both metal meshes of power fill shapes.

TypeC: one of two metal edges of the spacing error is a designed original metal line, and the other is a metal mesh of a power fill shape.

As shown in FIG. 7, an engine performs real-time computing on regions with a TypeA spacing error, a TypeB spacing error, or a TypeC spacing error on the layout simultaneously, to find TypeA, TypeB, and TypeC prunable regions, that is, regions indicated by 4, 5, and 6 in the figure. Since the original metal line in the design is not allowed to be pruned, the engine will automatically find a power fill mesh merged with the original metal line to serve as the TypeA prunable region.

With reference to FIG. 8, the repair module processes the TypeA, TypeB, and TypeC regions on the layout in real time, where each prunable region is pruned by a small predetermined spacing width delta. For the region with a TypeA spacing error, the power fill mesh prunable region is pruned by a distance of the predetermined spacing width delta along the arrow direction. For the region with aTypeB spacing error, each power fill mesh prunable region is pruned by a distance of delta/2 along the arrow direction, where a total of pruned distance along two directions is the predetermined spacing width delta. For the region with a TypeC spacing error, the power fill mesh prunable region is pruned by a distance of the predetermined spacing width delta along the arrow direction.

With reference to FIG. 9, after the repair module prunes each of the power fill meshes corresponding to the TypeA, TypeB, and TypeC regions by the predetermined spacing width delta, the detection module will automatically perform the real-time DRC space check on the entire layout again. The TypeA spacing error in region 7 is fixed, the TypeB spacing error in region 8 still exists, the TypeC spacing error in region 9 still exists, and a new TypeA spacing error is generated in region 10. Regions 8, 9, and 10 need further repair.

If it is detected that the total number of TypeA, TypeB, and TypeC errors is still greater than 0, the process automatically proceeds to the next round of pruning iteration for power fill meshes, with a step size of the predetermined spacing width delta. If it is detected that the total number of TypeA, TypeB, and TypeC errors is 0, the engine ends the pruning iterations for power fill meshes. With reference to FIG. 9, after the pruning in step S3, the process returns to step S2, to perform the DRC space check again. Space errors in regions 8, 9, and 10 are detected, and step S3 is performed again to fix the errors, until there is no space error.

Figure 10:
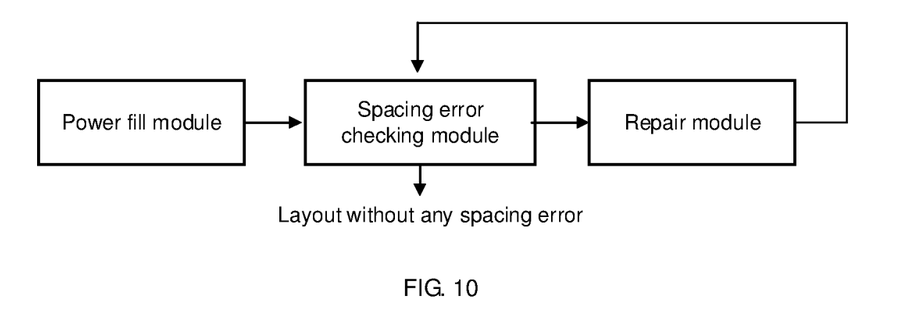
FIG. 10 is a schematic structural diagram of an integrated circuit layout apparatus.

According to another aspect, an apparatus of designing an integrated circuit is provided, which includes a power fill module, a spacing error checking module, and a repair module, as shown in FIG. 10.

The power fill module is configured to load a power fill to a layout.

The spacing error checking module is configured to check whether a current layout includes a region with a spacing error, if yes, the repair module repairs the region with a spacing error; otherwise, the spacing error checking module outputs a repaired layout.

The repair module is configured to prune a power fill shape corresponding to the region with a spacing error by a predetermined spacing width, and output the current layout after the pruning to the spacing error checking module.

In some optional embodiments of the present application, the region with a spacing error detected by the spacing error checking module includes two metal edges tangent to the region with a spacing error, where spacing between is the two metal edges along a width direction is less than a minimum spacing threshold.

In some optional embodiments of the present application, regions with spacing errors include three error types:

First error type: two metal edges are both formed by original metal lines.

Second error type: two metal edges are both formed by power fill shapes.

Third error type: one metal edge is formed by a power fill shape, and the other metal edge is formed by an original metal line.

In some optional embodiments of the present application, if the error type is the first error type, the two metal edges are both formed by original metal lines, and along a direction perpendicular to a first metal edge and a direction perpendicular to a second metal edge, the repair module searches for a power fill shape connected to the first metal edge and a power fill shape connected to the second metal edge, and prunes the power fill shapes by a total of the predetermined spacing width. In some optional embodiments of the present application, the repair module prunes the power fill shape connected to the first metal edge and the power fill shape connected to the second metal edge by a half of the predetermined spacing width, that is, delta/2 respectively.

In some optional embodiments of the present application, if the error type is the second error type, if the two metal edges are both formed by power fill shapes, the repair module prunes the power fill shapes forming the two metal edges by a half of the predetermined spacing width, that is, delta/2 respectively.

In some optional embodiments of the present application, if the error type is the third error type, if one of the two metal edges is formed by a power fill shape and the other is formed by an original metal line, the repair module prunes the power fill shape forming one of the metal edges by the predetermined spacing width. Alternatively, the repair module may search, along a direction perpendicular to the other metal edge, for a power fill shape connected to the other metal edge, and prunes the power fill shape connected to the other metal edge and the power fill shape forming one of the metal edges is by a half of the predetermined spacing width, that is, delta/2 respectively.

In some optional embodiments of the present application, the predetermined spacing width delta is less than 1/20 to 1/2 of the minimum spacing threshold.

In conclusion, the present application provides a method and an apparatus of designing an integrated circuit. The method includes the following steps: S1, loading a power fill to a circuit layout with original metal lines; S2, checking whether a current layout includes a region with a spacing error; if yes, performing S3; otherwise, outputting the current layout; and S3, pruning a power fill shape corresponding to the region with a spacing error by a predetermined spacing width, and returning to S2. The present application can help layout engineers efficiently solve the metal spacing errors caused by the addition of the power fill on the layout, which saves time. The layout module repaired with a tool can correct spacing errors while retaining as many added power fill meshes as possible.

Figure 11:
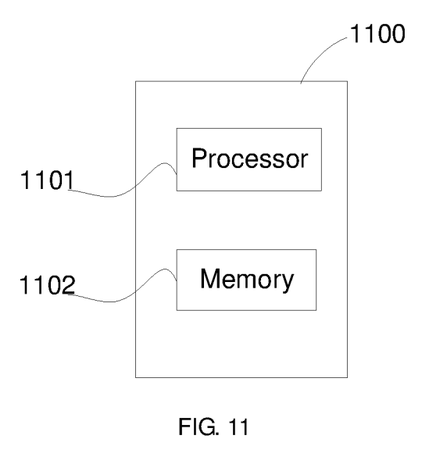
FIG. 11 is a block diagram of an apparatus of designing an integrated circuit according to an embodiment.

An exemplary embodiment of the present application provides an apparatus of designing an integrated circuit. Referring to FIG. 11, the apparatus of designing an integrated circuit 1100 may be provided as a terminal device. The apparatus of designing an integrated circuit 1100 may include a processor 1101, and one or more processors may be set as required. The apparatus of designing an integrated circuit 1100 may further include a memory 1102 configured to store an executable instruction, such as an application program, of the processor 1101. One or more memories may be set as required. The memory may store one or more application programs. The processor 1101 is configured to execute the instruction to perform the foregoing method.

Persons skilled in the art should understand that the embodiments of the present application may be provided as a method, an apparatus (device), or a computer program product. Therefore, the present application may use a form of hardware only examples, software only examples, or examples with a combination of software and hardware. Moreover, the present application may is be in a form of a computer program product that is implemented on one or more computer-usable storage media that include computer-usable program code. The computer storage media include volatile and non-volatile, removable and non-removable media implemented in any method or technology for storing information (such as computer-readable instructions, data structures, program modules, or other data), including but not limited to, a RAM, a ROM, an EEPROM, a flash memory or other storage technologies, a CD-ROM, a digital versatile disk (DVD) or other optical disc storage, a magnetic cassette, a magnetic tape, magnetic disk storage or other magnetic storage apparatuses, or any other medium that can be used to store desired information and can be accessed by a computer. In addition, as is well known to persons of ordinary skill in the art, the communication media usually contain computer-readable instructions, data structures, program modules, or other data in modulated data signals such as carrier waves or other transmission mechanisms, and may include any information transfer medium.

In an exemplary embodiment, a non-transitory computer-readable storage medium including instructions is provided. Referring to FIG. 11, for example, the non-transitory computer-readable storage medium may be the memory 1102 including instructions. The foregoing instructions may be executed by the processor 1101 of the apparatus of designing an integrated circuit 1100 to complete the foregoing method. For example, the non-transitory computer-readable storage medium may be a ROM, a RAM, a CD-ROM, a magnetic tape, a floppy disk, an optical data storage device, or the like.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

It should be understood that the above specific embodiments of the present application are merely used to illustrate or explain the principles of the present application, but do not limit the present application. Therefore, any modifications, equivalent substitutions, improvements and the like made without departing from the spirit and scope of the present application should be included in the protection scope of the present application. In addition, the appended claims of the present application are intended to cover all changes and modifications that fall within the scope and boundaries, or equivalents of such scope and boundaries of the appended claims.

The invention claimed is:

1. A method of designing an integrated circuit, comprising:
   S1: loading a power fill to a layout with original metal lines;
   S2: checking whether a current layout comprises a region with a spacing error;
   when yes, performing S3; otherwise, outputting the current layout; and
   S3: pruning a power fill shape corresponding to the region with a spacing error by a predetermined spacing width, and returning to the S2;
   wherein the S2 further comprises:
   after the region with a spacing error is detected, identifying an error type of the region with a spacing error, wherein the error types comprise:
   a first error type: two metal edges of the region with a spacing error are both formed by original metal lines;
   a second error type: two metal edges of the region with a spacing error are both formed by power fill shapes; and
   a third error type: one of two metal edges of the region with a spacing error is formed by a power fill shape, and the other of two metal edges is formed by an original metal line;
   when the error type is the first error type, searching for a power fill shape connected to a first metal edge along a direction perpendicular to the first metal edge and a power fill shape connected to a second metal edge along a direction perpendicular to the second metal edge, and pruning the power fill shapes by a total of the predetermined spacing width.

2. The method of designing an integrated circuit according to claim 1, wherein the S2 comprises:
   checking whether a spacing between adjacent metal lines in the current layout is less than a minimum spacing threshold, and when yes, determining a region as the region with a spacing error.

3. The method of designing an integrated circuit according to claim 1, wherein the power fill shape connected to the first metal edge and the power fill shape connected to the second metal edge are pruned by a half of the predetermined spacing width respectively.

4. The method of designing an integrated circuit according to claim 1, when the error type is the second error type, pruning the power fill shapes forming the two metal edges by a half of the predetermined spacing width respectively.

5. The method of designing an integrated circuit according to claim 1, when the error type is the third error type, pruning the power fill shape forming the one of two metal edges by the predetermined spacing width.

6. The method of designing an integrated circuit according to claim 5, when the error type is the third error type, searching for a power fill shape connected to the other of two metal edges along a direction perpendicular to the other of two metal edges, and pruning the power fill shape connected to the other of two metal edges and the power fill shape forming the one of two metal edges by a half of the predetermined spacing width respectively.

7. The method of designing an integrated circuit according to claim 1, wherein the S2 comprises:
   when it is detected that a total number of the spacing error of the first error type, the second error type or the third error type is greater than 0, determining that the current layout comprises the region with a spacing error, and performing the S3.

8. The method of designing an integrated circuit according to claim 1,
   wherein the predetermined spacing width is less than $1/20$ to $1/2$ of a minimum spacing threshold.

9. An apparatus of designing an integrated circuit, comprising:
   one or more processors; and
   a storage apparatus, configured to store one or more programs, wherein the one or more programs, when executed by the one or more processors, cause the one or more processors to execute operations of:
   loading a power fill to a layout;
   checking whether a current layout comprises a region with a spacing error, when yes, repairing the region with a spacing error; otherwise, outputting a repaired layout;
   after the region with a spacing error is detected, identifying an error type of the region with a spacing error, wherein the error types comprise:
   a first error type: two metal edges of the region with a spacing error are both formed by original metal lines;
   a second error type: two metal edges of the region with a spacing error are both formed by power fill shapes; and
   a third error type: one of two metal edges of the region with a spacing error is formed by a power fill shape, and the other of two metal edges is formed by an original metal line;
   when the error type is the first error type, searching for a power fill shape connected to a first metal edge along a direction perpendicular to the first metal edge and a power fill shape connected to a second metal edge along a direction perpendicular to the second metal edge, and pruning the power fill shapes by a total of the predetermined spacing width; and pruning a power fill shape corresponding to the region with a spacing error by a predetermined spacing width, and outputting the current layout after the pruning to the checking whether a current layout comprises a region with a spacing error.

10. The apparatus of designing an integrated circuit according to claim 9, wherein the one or more programs cause the one or more processors to execute operations of: checking whether a spacing between metal lines tangent to a region in the current layout is less than a minimum spacing threshold, and when yes, determining the region as the region with a spacing error.

11. The apparatus of designing an integrated circuit according to claim 9, wherein the one or more programs cause the one or more processors to execute operations of: pruning the power fill shape connected to the first metal edge and the power fill shape connected to the second metal edge by a half of the predetermined spacing width respectively.

12. The apparatus of designing an integrated circuit according to claim 10, wherein the one or more programs cause the one or more processors to execute operations of: when an error type is a second error type, pruning power fill shapes forming two metal edges by a half of the predetermined spacing width respectively.

13. The apparatus of designing an integrated circuit according to claim 12, wherein the one or more programs cause the one or more processors to execute operations of: when the error type is a third error type, pruning a power fill shape forming one of two metal edges by the predetermined spacing width.

14. The apparatus of designing an integrated circuit according to claim 12, wherein the one or more programs cause the one or more processors to execute operations of: when the error type is a third error type, searching for a power fill shape connected to the other of two metal edges along a direction perpendicular to the other of two metal edges, and pruning the power fill shape connected to the other of two metal edges and a power fill shape forming one of two metal edges by a half of the predetermined spacing width respectively.

15. The apparatus of designing an integrated circuit according to claim 9, wherein the one or more programs cause the one or more processors to execute operations of: when it is detected that a total number of the spacing error of a first error type, a second error type or a third error type is greater than 0, determining that the current layout comprises the region with a spacing error, and starts the pruning a power fill shape corresponding to the region with a spacing error by a predetermined spacing width, and outputting the current layout after the pruning to the checking whether a current layout comprises a region with a spacing error.

16. The apparatus of designing an integrated circuit according to claim 9, wherein the predetermined spacing width is less than $1/20$ to $1/2$ of a minimum spacing threshold.

* * * * *